US012497271B2

(12) United States Patent
Walter et al.

(10) Patent No.: US 12,497,271 B2
(45) Date of Patent: Dec. 16, 2025

(54) AUXILIARY TIP FOR THE BOOM OF A WORK MACHINE

(71) Applicant: Liebherr-Werk Ehingen GmbH, Ehingen/Donau (DE)

(72) Inventors: Jan Walter, Laichingen (DE); Bernd Boos, Mehrstetten (DE)

(73) Assignee: LIEBHERR-WERK EHINGEN GMBH, Ehingen/Donau (DE)

(*) Notice: Subject to any disclaimer, the term of this patent is extended or adjusted under 35 U.S.C. 154(b) by 237 days.

(21) Appl. No.: 18/352,119

(22) Filed: Jul. 13, 2023

(65) Prior Publication Data

US 2024/0017971 A1 Jan. 18, 2024

(30) Foreign Application Priority Data

Jul. 13, 2022 (DE) ..................... 10 2022 117 472.7

(51) Int. Cl.
*B66C 23/66* (2006.01)
*B66C 23/68* (2006.01)
*B66C 23/70* (2006.01)

(52) U.S. Cl.
CPC .............. *B66C 23/70* (2013.01); *B66C 23/66* (2013.01); *B66C 23/68* (2013.01)

(58) Field of Classification Search
CPC ....... B66C 23/66; B66C 23/68; B66C 23/702; B66C 23/42
See application file for complete search history.

(56) References Cited

U.S. PATENT DOCUMENTS 7,878,346 B1 * 2/2011 Watts .................... B66C 23/702 212/300
9,738,497 B2 * 8/2017 Nakamura ............ B66C 23/702
2022/0194754 A1 * 6/2022 Urban .................. B66C 23/826

FOREIGN PATENT DOCUMENTS

DE 202022103551 U1 7/2022
GB 2569846 B * 4/2020 ............. B66C 23/42

* cited by examiner

*Primary Examiner* — Anna M Momper
*Assistant Examiner* — Juan J Campos, Jr.
(74) *Attorney, Agent, or Firm* — McCoy Russell LLP

(57) ABSTRACT

The invention relates to an auxiliary tip for detachable mounting on a boom of a work machine, in particular a mobile crane. The auxiliary tip comprises first connecting elements for establishing a first connection with a first boom part, and second connecting elements for establishing a second connection with the first boom part. In order to be able to connect the auxiliary tip to a second boom part having a system dimension different from the first boom part, the auxiliary tip according to the invention comprises third connecting elements with which a second connection to a second boom part can be established instead of the second connecting elements. While the auxiliary tip is connected to the first boom part via the first and second connecting elements, the auxiliary tip can be releasably connected to a second boom part via the third connecting elements.

16 Claims, 8 Drawing Sheets

AUXILIARY TIP FOR THE BOOM OF A WORK MACHINE

CROSS REFERENCE TO RELATED APPLICATION

The present application claims priority to German Patent Application No. 10 2022 117 472.7 filed on Jul. 13, 2022. The entire contents of the above-listed application are hereby incorporated by reference for all purposes.

TECHNICAL FIELD

The present invention relates to an auxiliary tip for detachable mounting on a boom of a work machine, in particular on a boom of a mobile crane, according to the preamble of claim 1, and to a work machine, in particular a mobile crane, having such an auxiliary tip.

BACKGROUND

Mobile cranes typically have a boom that is hinged about a horizontal axis to an upper carriage that is rotatably mounted on an undercarriage. The boom can be luffed up and down about the horizontal axis or within a vertical plane, also referred to as a luffing plane. Mobile cranes of this type may comprise either a rigid lattice boom or a telescopic boom comprising a number of telescopic sections mounted so that they can be moved one inside the other.

SUMMARY

In the case of a telescopic boom, the innermost telescopic section usually has a pulley head at its end, which includes one or more pulleys. A hook block for attaching a load is suspended from the boom by a hoisting cable, the hoisting cable being guided or reeved over the sheaves of the pulley head and being mounted for winding and unwinding on a hoisting cable winch mounted on or near the upper carriage. In a lattice boom, a main boom may also have a pulley head or one or more sheaves at its end over which a hoist rope is guided.

For both telescopic booms and lattice booms, it is known to increase the boom length by means of attachments. For example, rigid lattice boom tips or inclinable luffing tip tips can be attached to the pulley head of a telescopic boom directly or via an adapter piece.

The usefulness of a mobile crane can be increased if two hook blocks can be used simultaneously and independently of each other (ideally, in this case, the mobile crane comprises two independently operated hoisting winches).

Two hook blocks may be used for several reasons: Firstly, a first hook block with high reeving and a second hook block with low reeving of the hoisting rope can be used. In this way, the crane operator has a strong (and slow) hook block for heavy loads on the one hand and a fast (and weak) hook block for fast lifts on the other hand without having to re-shear one hook block. On the other hand, two independently lifting and lowering hook blocks can be used for turning or positioning components. By using two hook blocks, for example, positioning can be performed independently of the center of gravity of the component.

Several solutions for this are known from the prior art, including the use of a so-called auxiliary tip that can be attached to the end of a lattice boom or luffing tip or directly to the pulley head of a telescopic boom. Such auxiliary tips usually comprise a separate roller pack for reeving a second hoisting rope, to which a second hook block is attached.

FIG. 1 shows a prior art mobile crane 1 with two hook blocks 6*a*, 6*b* in a side view. The mobile crane 1 comprises a mobile undercarriage 2, an upper carriage 3 rotatably mounted thereon and a telescopic boom 4 luffably mounted on the upper carriage 3. A braced luffing tip 5 is mounted at the tip of the telescopic boom 4, and an auxiliary tip 10' is in turn attached to the end of the boom. FIG. 2 shows the attached auxiliary tip 10' in an enlarged view. A first hook block 6*a* is suspended from the end of the luffing tip 5, while a second hoisting rope with a second hook block 6*b* is passed over the auxiliary tip 10'. The two hook blocks 6*a*, 6*b* can be moved independently of each other via separate hoisting winches.

In order to be able to connect a component of the boom system with another component, both parts must generally have connecting elements at the same points, i.e. the connecting elements must fit together geometrically. In the case of crane components, the connecting elements are generally formed by so-called fork-finger connections, which are inserted into each other and bolted together. The connecting elements of a crane component are usually arranged in a plane and rectangular. The connecting elements have a certain distance to each other, which can also be referred to as the system dimension.

Crane components can generally have different system dimensions, as they are usually load-optimized. This means that the force is directed through the crane component in as straight a line as possible or without deflections. This results in additional advantages in terms of transport dimensions and dead weight. A system dimension that is too large inflates the component. A component that is too large in turn has disadvantages in terms of wall thicknesses; for example, the increased buckling lengths of the diagonals necessitate greater wall thicknesses. A system dimension that is too small has disadvantages in the section modulus, so that greater wall thicknesses are required in the corner posts. A system dimension does not have to be rectangular (i.e. the connecting elements do not have to form the corners of a rectangle), but can also have any other shape, depending on the boundary conditions. Even an asymmetric shape is theoretically conceivable.

However, the use of different system dimensions means that not all crane axes can be attached to any other crane components if these have different system dimensions. For this reason, it is known from the prior art to use adapter pieces in order to be able to optionally connect auxiliary tips to different booms or boom parts (e.g. a pulley head and a luffing tip), each of which has a different system dimension.

FIGS. 3*a* and 3*b* show a prior art example of such an adapter 7, each in a side view. The adapter 7 serves to connect the auxiliary tip 10' to a pulley head 8 of a telescopic boom 4, which each have a different system dimension and therefore cannot be directly connected to each other. For this purpose, the adapter 7 has first connecting means 9*a* for bolting to corresponding connecting means of the pulley head 8. On the opposite side, the adapter 7 has second connecting means 9*b* which can be bolted to corresponding connecting means of the auxiliary tip 10'. FIG. 3*b* shows the adapter 7 in the assembled state. The adapter 7 is thus located between the pulley head 8 (on the telescopic boom head) and the auxiliary tip 10' and compensates for the system dimension differences. The pulley head 8 and the auxiliary tip 10' remain unchanged, their ideal force flow path is maintained (for this purpose, the connecting means 9$a$, 9$b$ of the adapter 7 are configured and oriented accordingly).

However, the use of such an adapter is not ideal, as it means an additional assembly effort as well as an increased weight of the boom or another component to be transported.

The present invention is therefore based on the object of facilitating the use of such an auxiliary tip. In particular, it should be possible to use the auxiliary tip in a simple manner for different crane components with different system dimensions.

This object is achieved according to the invention by an auxiliary tip having the features of claim 1. Advantageous embodiments of the invention result from the dependent claims and the following description.

Accordingly, an auxiliary tip for detachable mounting on a boom of a work machine, in particular a mobile crane, is proposed. The auxiliary tip comprises first connecting elements for establishing a first connection with a first boom part and second connecting elements for establishing a second connection with the first boom part. The first and second connecting elements have or define a first system dimension.

In order to be able to connect the auxiliary tip to a second boom part which has a second system dimension different from the first boom part, the auxiliary tip comprises, according to the invention, third connecting elements with which a second connection to a second boom part can be established instead of the second connecting elements. While the auxiliary tip is connected to the first boom part via the first and second connecting elements, the auxiliary tip can be releasably connected to a second boom part via the third connecting elements. According to the invention, the second connecting elements have a different distance to each other than the third connecting elements, i.e. they define a different system dimension.

This allows the auxiliary tip to be attached directly, i.e. without using an adapter, to boom parts with different system dimensions. Depending on the boom part and system dimension, the second connection is made either via the second connecting elements or via the third connecting elements.

Ideally, for all boom parts, the first connection is made via the same first connecting elements of the auxiliary tip. In this case, the auxiliary tip can be detachably connected to a second boom part via the first and third connecting elements. However, it is of course also conceivable that further connecting elements are provided in addition to the first, second and third connecting elements in order to enable the auxiliary tip to be connected to even more system dimensions. For example, it is conceivable that a connection of the auxiliary tip to a first boom part is made via first and second connecting elements and to a second boom part via third and fourth connecting elements, i.e. the first connecting elements are not used for several boom parts in this case. In this case, the fourth connecting elements can have a different distance to each other than the first connecting elements. However, even in the case where fourth and possibly further connecting elements are present, the first connecting elements can of course be used to connect the auxiliary tip to more than one boom part (e.g. connection to a first boom part via the first and second connecting elements, connection to a second boom part via the first and third connecting elements, and connection to a third boom part via the third and fourth connecting elements).

The fact that the auxiliary tip according to the invention carries several connecting elements with different system dimensions means that there is no need to use an additional adapter. This means that one less component has to be transported or assembled, which saves time and reduces the boom and transport weight.

In one possible embodiment, the auxiliary tip is provided with exactly two first connecting elements. Alternatively or additionally, the auxiliary tip can have exactly two second connecting elements. Alternatively or additionally, the auxiliary tip can have exactly two third connecting elements. This results in optimum mounting of the auxiliary tip on the respective boom part.

In a further possible embodiment, it is provided that the first connection and/or the second connection constitutes or comprises a bolt connection, wherein the second and third connecting elements preferably each have a bolt receptacle. Preferably, connecting elements of a fork-finger connection are bolted together after a corresponding nesting. The first connecting elements may also have a bolt receptacle.

In a further possible embodiment, it is provided that the second and third connecting elements are located in a common first plane. Preferably, the second and third connecting elements each comprise bolt receptacles for producing a bolt connection and are configured in such a way that the imaginary longitudinal axes of the bolt connections that can be produced via the second and third connecting elements are located in the common first plane. In other words, the imaginary central axis extending centrally through the bolt receptacles of the second connecting elements pointing towards each other (also referred to as second connecting axis) is located in a plane with the imaginary central axis extending centrally through the bolt receptacles of the third connecting elements pointing towards each other (also referred to as third connecting axis). The respective bolts for producing the second connection are set along these center or connection axes.

Alternatively or additionally, it may be provided that the first connecting elements are arranged on first corner posts of the auxiliary tip and comprise bolt receptacles. The bolt receptacles can be closed bolt receptacles, but preferably open bolt receptacles with a degree of freedom for establishing a pressure-transmitting connection. The bolt receptacles of the first connecting elements are configured in such a way that the imaginary longitudinal axis of the bolt connection that can be produced via the first connecting elements is located in a common second plane with said first corner posts. The first corner posts preferably extend parallel to one another.

In a further possible embodiment, it is provided that the auxiliary tip can be releasably connected to a second boom part via the first and third connecting elements. Alternatively or additionally, the auxiliary tip may comprise fourth connecting elements and can be releasably connected to a second boom part via the third and fourth connecting elements, wherein the fourth connecting elements in particular are at a different distance from one another than the first connecting elements.

In another possible embodiment, it may be provided that the first plane and/or the second plane intersects an axis of rotation of a pulley or pulley block of the auxiliary tip, i.e. the pulley axis of rotation also is located in the first and/or second plane. In the case where both the first plane and the second plane intersect the axis of rotation, the auxiliary tip in particular has a substantially triangular shape when viewed from the side. The pulley or pulley block is used in particular for deflecting or reeving a hoisting rope for a (second) hook block. The axis of rotation of the pulley or pulley block preferably extends perpendicular to the luffing plane of the crane, i.e. in particular horizontally, when the crane is in operation with the auxiliary tip mounted.

Alternatively, other geometries of the auxiliary tip are conceivable. For example, two pulleys or pulley blocks can be provided, the axes of rotation of which are spaced apart and parallel to each other, in particular perpendicular to the luffing plane or horizontal in crane operation with the auxiliary tip mounted. Here, one of the axes of rotation may extend in the first plane and the other axis of rotation in the second plane. Furthermore, a form is conceivable in which at least one pulley or pulley block is provided with an axis of rotation which intersects the first and/or second plane at an angle and, for example, extends parallel to the luffing plane of the crane in crane operation with the auxiliary tip mounted.

In another possible embodiment, it is provided that the auxiliary tip comprises a lattice structure, wherein the lattice structure comprises first corner posts on which the first connecting elements are arranged and second corner posts on which the second connecting elements are arranged. Preferably, the respective connecting elements are arranged at the ends or front sides of the corner posts. The first and second corner posts may be interconnected by a plurality of connecting struts, resulting in a stable lattice structure.

The lattice structure preferably has a substantially triangular shape when viewed from the side, and preferably at least two sides of this triangular shape are formed by the first and second corner posts. In particular, the first and second connecting members are arranged on the side of the lattice structure opposite the pointed end of the lattice structure. A pulley or pulley block for a hoisting cable may be located at the pointed end of the lattice structure.

The lattice structure can be configured in such a way that the first corner posts are loaded predominantly in compression and the second corner posts are loaded predominantly in tension during crane operation or in the assembled state. The first corner posts are preferably located below the second corner posts (at least in the assembled state and with a substantially horizontal orientation of the boom).

Preferably, during crane operation or in the assembled state, the forces are directed substantially through the first and second corner posts, particularly without significant detour between the points of connection of the auxiliary tip to the boom section and an axis of rotation of a pulley or pulley block for a hoist rope.

Preferably, in a state in which the auxiliary tip is connected to a boom part via the third connecting elements, the forces introduced into the third connecting elements are conducted along at least part of the second corner posts. Thus, no further corner posts or a supporting steel structure need to be provided for the third connecting elements in the lattice structure of the auxiliary tip, which reduces its own weight.

Preferably, the third connecting elements are arranged close to the second corner posts (for example, the distance of the third connecting elements to the adjacent second corner posts can be smaller than the distance of the third connecting elements to each other and/or to a plane extending centrally between the second corner posts), so that there is as little leverage and deflection as possible in the force flow from the third connecting elements into the second corner posts.

In another possible embodiment, it is provided that the second corner posts extend in a common first plane and the first corner posts extend outside the first plane, preferably in a second plane intersecting the first plane at an acute angle. Since the forces are preferably directed substantially along the corner posts, said planes may also be referred to as first and second force flow planes. The two planes preferably intersect in the axis of rotation of the pulley or pulley block for the hoist rope, or at least in the region of this axis of rotation.

In another possible embodiment, it is provided that the third connecting elements are arranged on a strut connecting the second corner posts to one another. The strut can be a cross strut connecting the two second corner posts. The third connecting elements preferably have a smaller distance to each other than the first and/or second connecting elements, i.e. they define a smaller system dimension. The third connecting elements preferably point in the same direction as the second connecting elements.

In another possible embodiment, it is provided that the second connecting elements have a greater distance to the first connecting elements and/or to an axis of rotation of a pulley or pulley block of the auxiliary tip than the third connecting elements.

Preferably, the first and second connecting elements are located in a common plane and the first and third connecting elements are located in another common plane extending at a certain (and in particular acute) angle thereto.

In another possible embodiment, it is provided that the first and second connecting elements form the corners of a rectangle or a trapezoid. Alternatively or additionally, it may be provided that the first and third connecting elements form the corners of a rectangle or a trapezoid.

Preferably, the distance between the first connecting elements corresponds to the distance between the second or the third connecting elements. In this case, the first and second connecting elements together form the corners of a rectangle and the first and third connecting elements together form the corners of a trapezoid, or vice versa.

Preferably, the arrangement of the first, second and third connecting elements is symmetrical to each other with respect to a symmetry plane extending centrally through the auxiliary tip. However, depending on the application or connection geometry, asymmetrical arrangements of individual or all connecting elements can also be used.

In a further possible embodiment, it is provided that the first connecting elements comprise a degree of freedom for establishing a pressure-transmitting connection. Due to the first connection that can be established via the first connecting elements, the auxiliary tip is thus in particular not completely fixed in all directions at the corresponding boom part, but a movement of the auxiliary tip relative to the boom part along said degree of freedom is possible.

Preferably, the first connecting elements comprise open bolt receptacles, wherein the establishment of the first connection is preferably performed by pivoting the auxiliary tip, in particular around the already established second connection using the second or third connecting elements, relative to a boom part. Thus, the first connection preferably does not definitively fix the auxiliary tip in all directions, but rather allows the auxiliary tip to pivot, particularly about the second connection. Since the first connection is preferably located below the second connection, the first connecting elements are pressed towards the boom part by the dead weight of the auxiliary tip and possibly a load attached thereto, so that the first connection is maintained by itself or is not released during operation. However, an additional locking mechanism may be provided to lock the first connection for operation.

The use of open bolt receptacles for the first connecting elements results in the advantage that the auxiliary tip is not overloaded during the assembly process. If, for example, the boom rests on the ground via a luffing tip mounted on it, the dead weight of the boom plus the luffing tip would weigh on the auxiliary tip mounted at the end of the luffing tip and thus place a correspondingly high load on the first and second connecting elements as well as on the lattice structure. These loads can far exceed the forces acting during crane operation and thus overload the auxiliary tip. The open bolt receptacles or forks allow the first connection to open and the auxiliary tip to swing away around the second connection so that the auxiliary tip is not overloaded. The auxiliary tip can have further pulleys in the area of the pulley or pulley block for the hoist rope, over which the auxiliary tip can roll on the ground.

In another possible embodiment, it is provided that the auxiliary tip comprises a pulley or pulley block for a hoisting rope of a work machine, wherein the pulley or pulley block preferably is arranged at an end of the auxiliary tip opposite to the first and/or second connecting elements. This allows a second hook block to be used via the auxiliary tip.

The first, second and third connecting elements are preferably rigidly connected to the lattice structure, i.e. they cannot be moved. The different system dimensions therefore do not result from the fact that connecting elements can be moved into different positions, but that several connecting elements with defined distances or system dimensions are provided.

The present invention further relates to a work machine, in particular a mobile crane, having a boom, in particular a telescopic boom, and an auxiliary tip according to the invention which can be detachably mounted on the boom. In this connection, the same advantages and properties arise as described previously for the auxiliary tip according to the invention, for which reason a repetitive description is dispensed with.

The second and third connecting members are preferably located in a common first plane which is perpendicular to a luffing plane of the boom. The first and second corner posts preferably extend parallel to the luffing plane.

In one possible embodiment, it is provided that the boom of the work machine comprises a first boom part, in particular a pulley head, which can be connected to the auxiliary tip only via the first and second connecting elements, i.e. the third connecting elements are not used here. The system dimension defined by the first and second connecting elements matches the system dimension of the corresponding connecting means of the first boom part.

Alternatively or additionally, the boom of the work machine can comprise a second boom part, in particular an attachment mountable on the first boom part, such as a luffing tip, which can be connected to the auxiliary tip only via the first and third connecting elements, i.e. the second connecting elements are not used here. The system dimension defined by the first and third connecting elements matches the system dimension of the corresponding connecting means of the second extension part.

At this point it should be noted that the term "connecting element" is used here for the connecting points of the auxiliary tip and the term "connecting means" for the corresponding connecting points of the boom parts. However, this conceptual difference is not intended to indicate an actual structural difference between these connection points, but serves in particular merely to distinguish linguistically between the connection points of the boom parts and the connection points of the auxiliary tip.

In another possible embodiment, it is provided that the auxiliary tip comprises a pulley or pulley block and is connected directly or via one or more intermediate pieces (e.g. a luffing tip) to a pulley head of the boom, wherein a first hook block is guided via the pulley head of the boom by means of a first hoisting rope and a second hook block is guided via the pulley or pulley block of the auxiliary tip by means of a second hoisting rope, wherein the hook blocks can preferably be raised and lowered independently of one another.

BRIEF DESCRIPTION OF THE FIGURES

Further features, details and advantages of the invention will be apparent from the examples of embodiments explained below with reference to the figures. The Figures show in.

DETAILED DESCRIPTION

Figure 1:
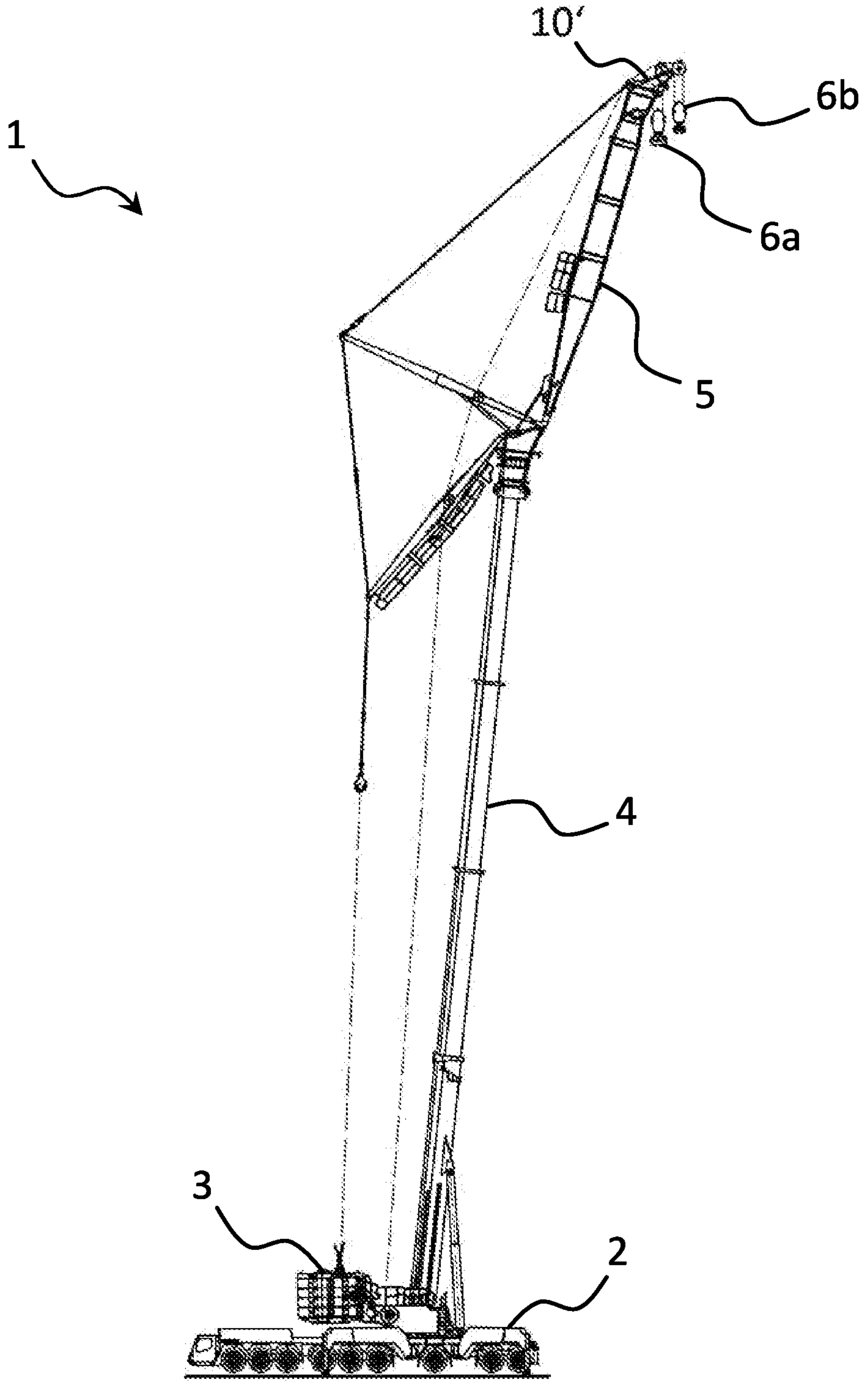
Fig. 1 (Prior Art)
FIG. 1: a side view of an example of a mobile crane known from the prior art with an auxiliary tip attached.
Figure 2:
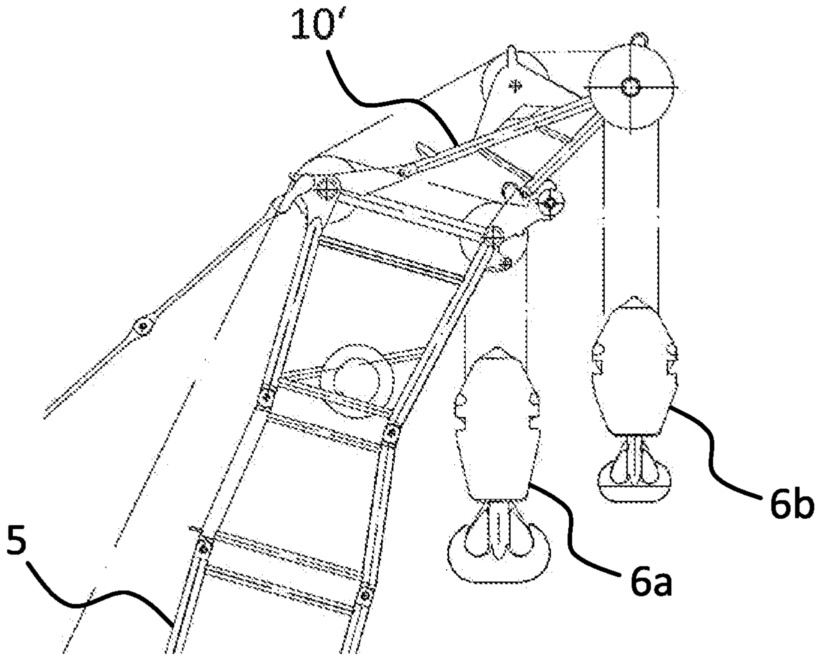
Fig. 2 (Prior Art)
FIG. 2: an enlarged view of the boom head part with auxiliary tip according to FIG. 1.
Figure 3B:
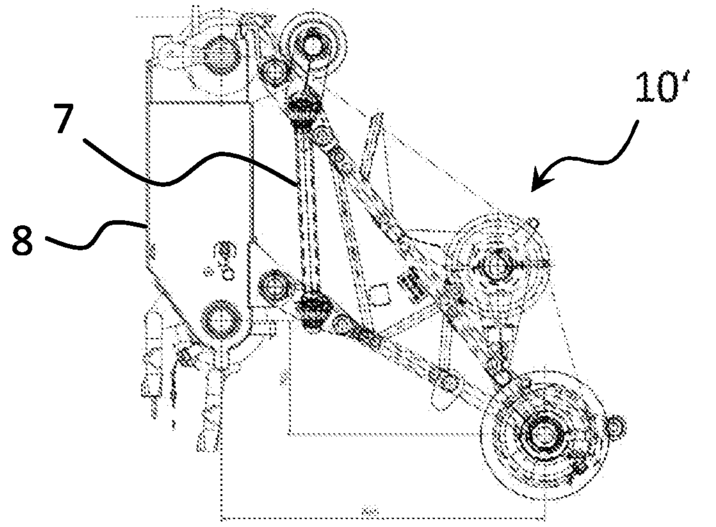
Fig. 3b (Prior Art)
FIG. 3*b*: the adapter according to FIG. 3*a* in the assembled state.
Figure 3A:
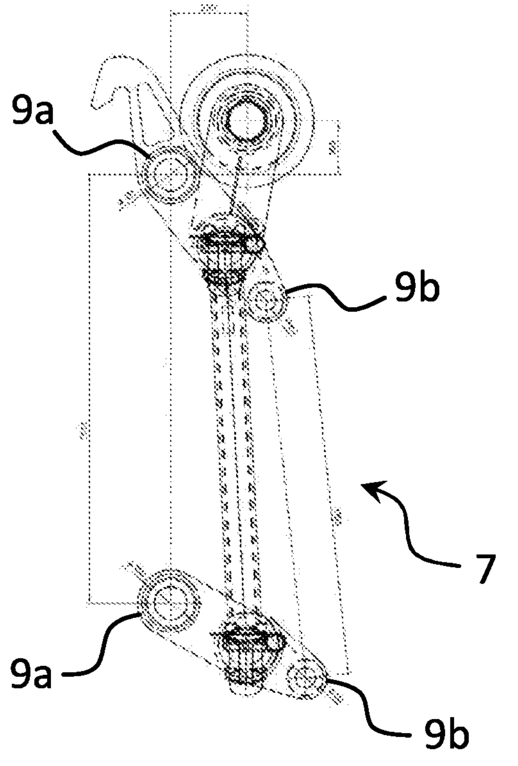
Fig. 3a (Prior Art)
FIG. 3*a*: a prior art example of an adapter for mounting an auxiliary tip in a side view.

FIGS. 1 and 2 show a mobile crane 1 according to the prior art with a known auxiliary tip. FIGS. 3*a* and 3*b* show prior art examples of an adapter 7, which is mounted between the head piece of a luffing tip 5 and the known auxiliary tip 10' to compensate for system dimension differences. These figures have already been discussed at the outset, so no repetitive description is given here.

FIGS. 4-8 show a preferred embodiment of the auxiliary tip 10 according to the invention. Components with reference characters which have already been used in FIGS. 1-3*b* and described at the beginning denote the same components and will not be explained again below.

Figure 4:
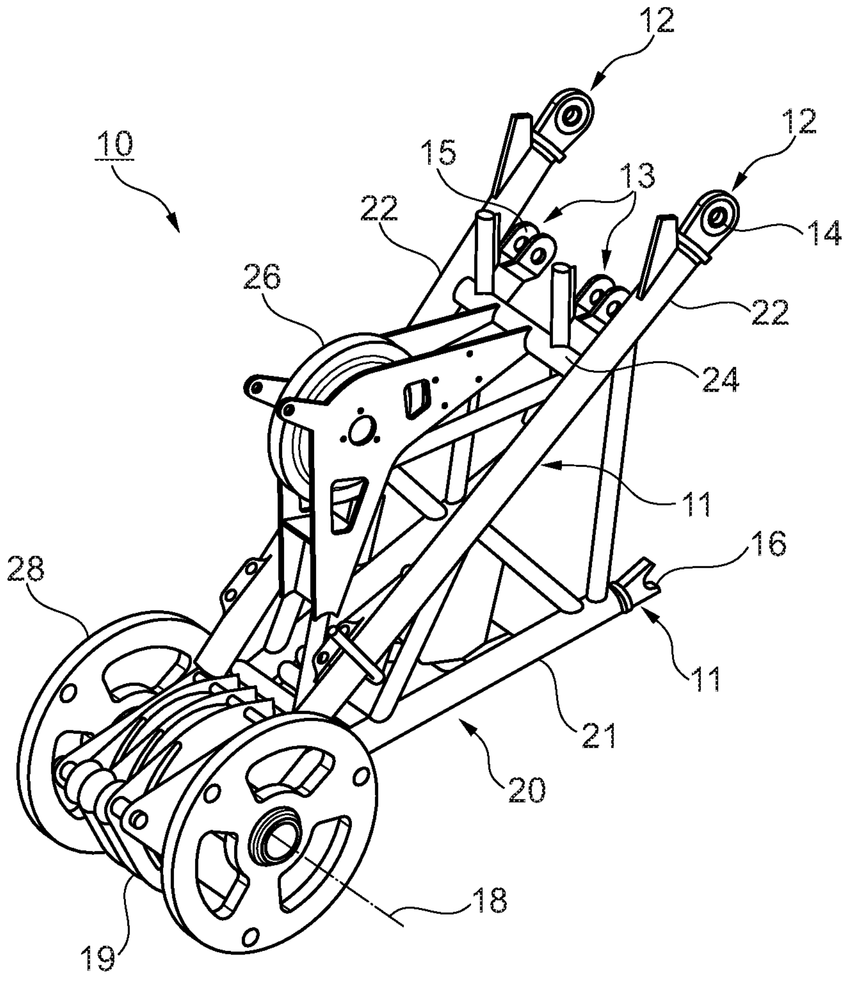
FIGS. 4-6: a preferred embodiment of the auxiliary tip according to the invention in various perspective views.
Figure 5:
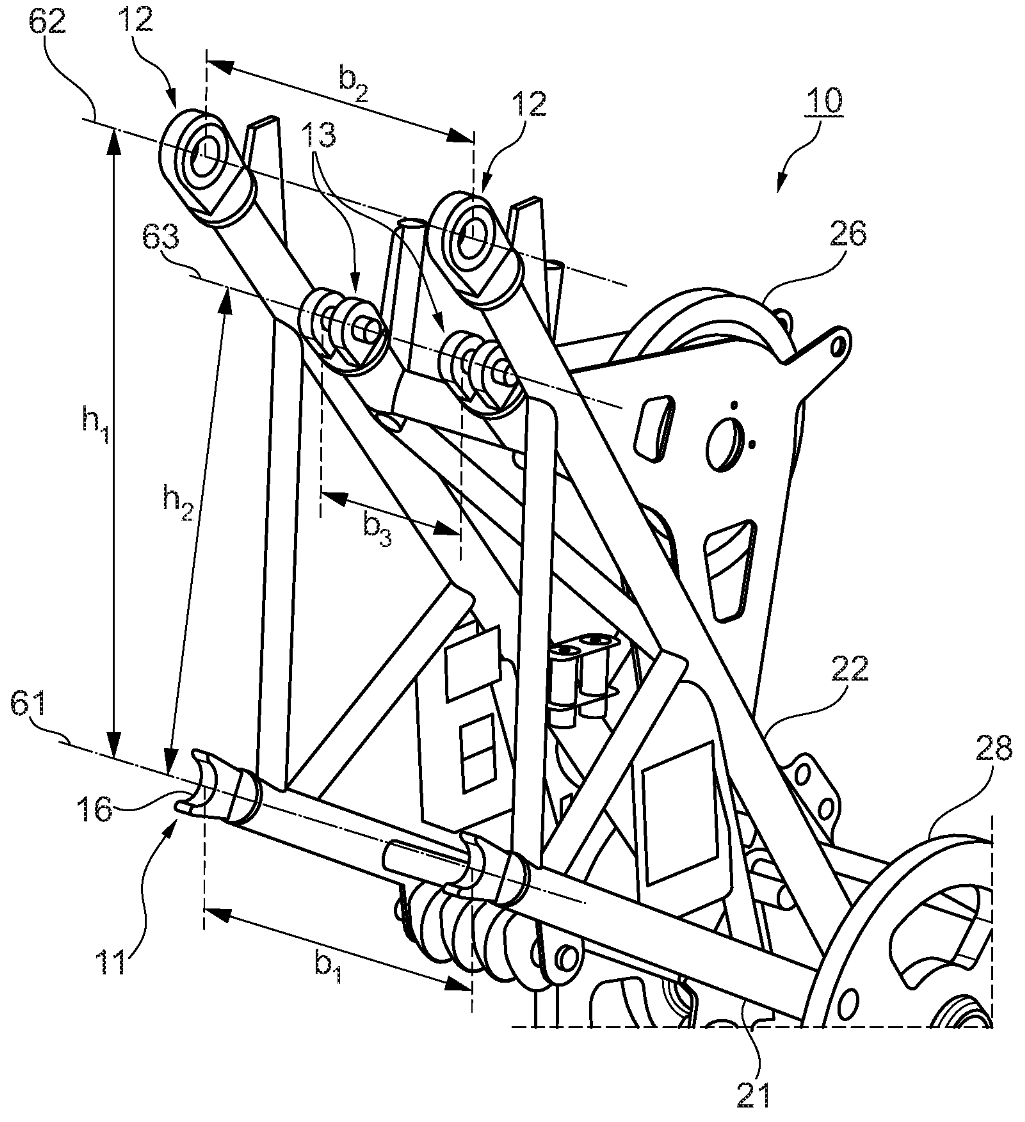

FIGS. 4 and 5 show perspective views of the auxiliary tip 10 according to the invention. The auxiliary tip 10 has a lattice structure 20, which comprises two first corner posts 21 and two second corner posts 22 extending at an (in this case acute) angle thereto, which form the supporting structure of the auxiliary tip 10. The corner posts 21, 22 are interconnected and stiffened by various struts.

The auxiliary tip 10 has a substantially triangular shape when viewed from the side, with first and second corner posts 21, 22 forming two of the sides of the triangle and meeting at an end of the auxiliary tip 10 remote from the boom 4 in the assembled condition. At this pointed end of the auxiliary tip 10 is a pulley block 19 having a plurality of pulleys for reeving a hoisting cable with a hook block. By mounting the auxiliary tip 10 on a boom 4, for example a pulley head 8 or the head piece of a luffing tip 5, a second hook block 6*b* can thus be used in addition to a first hook block 6*a* regularly used with the boom 4 (see FIG. 1). The shape of the auxiliary tip 10 is not limited to a substantially triangular shape. Other geometries of the lattice structure are also conceivable here.

In the embodiment shown, the second corner posts 22 form the longest side of the triangular auxiliary tip 10. At this longest side of the auxiliary tip 10, there is another deflection pulley 26 to guide the hoisting rope from the boom 4 to the pulley block 19 of the auxiliary tip 10. This deflection pulley 26 or its support is connected to cross braces extending between the corner posts 21, 22. The deflection pulley 26 can be used, for example, for load weighing.

The first and second corner posts 21, 22 meet in the region of an axis of rotation 18, about which the deflection pulleys of the pulley block 19 are rotatably mounted. Also rotatably mounted about the axis of rotation 18 are two additional rolls or pulleys 28, which are arranged on either side of the pulley block 19 and in particular have a larger diameter than the pulley block 19, so that the pulley block 19, viewed from the side, is located in particular within the circumference of the pulleys 28. This allows the auxiliary tip 10 to roll on the ground (see FIG. 8).

Figure 7:
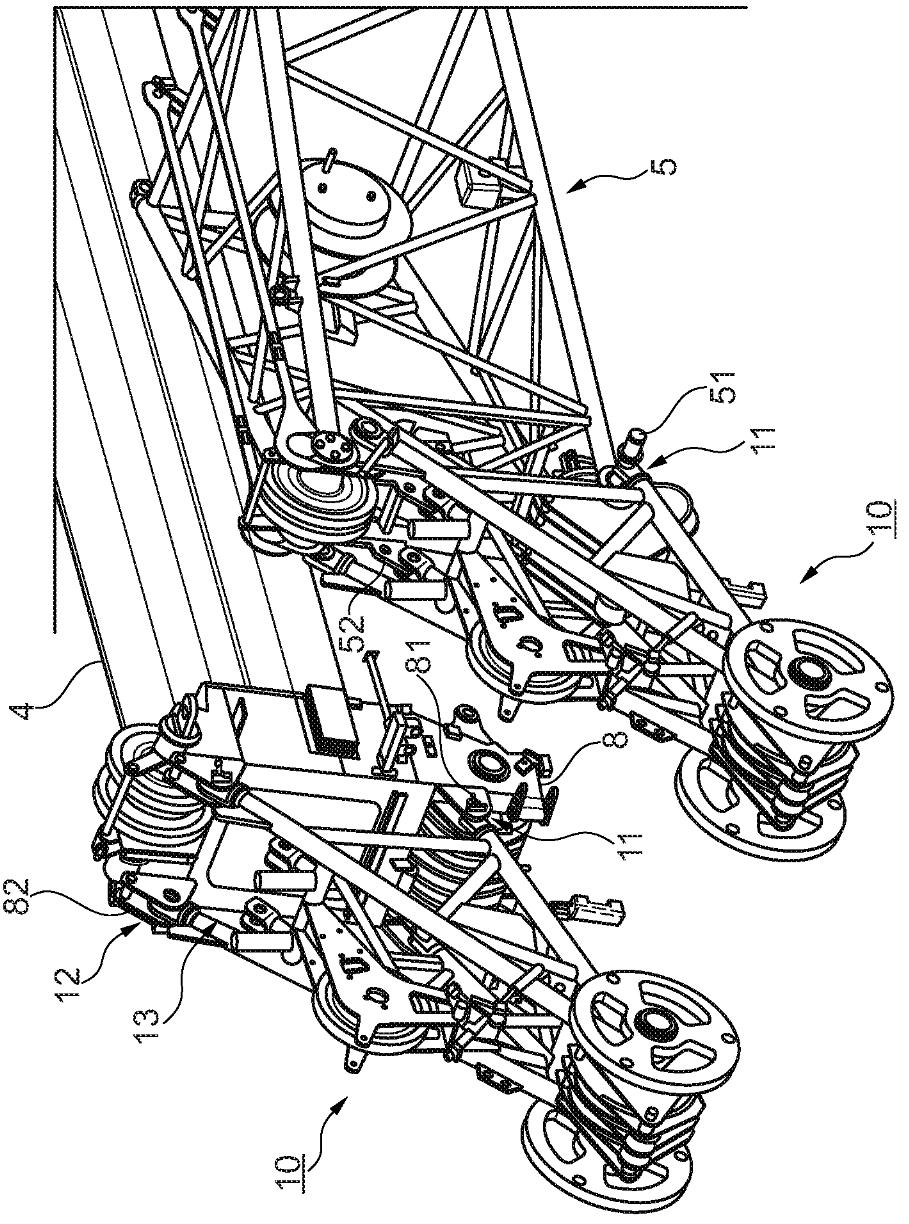
FIG. 7: perspective views of the auxiliary tip according to the invention mounted on a pulley head and on a luffing tip.
Figure 8:
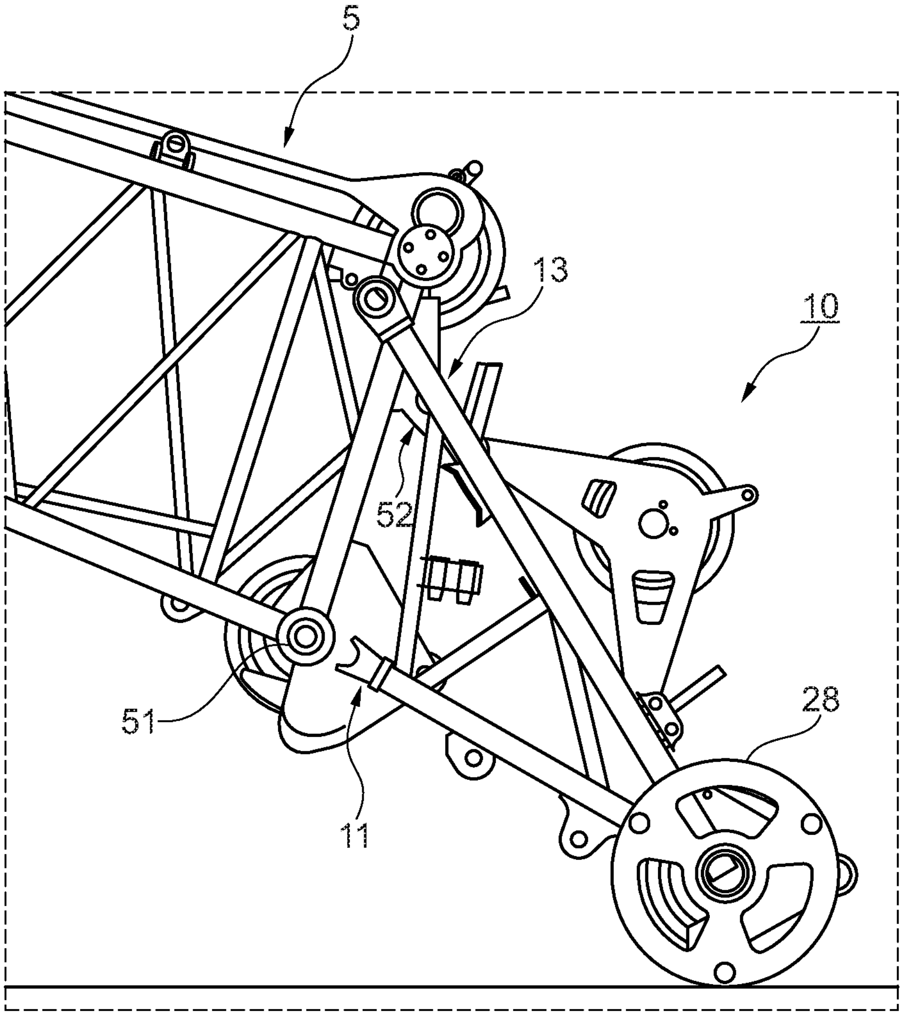
FIG. 8: a side view of the auxiliary tip mounted on a luffing tip as it rolls along the ground.

As can be seen particularly well in FIG. 5, the auxiliary tip 10 according to the invention comprises several connecting elements 11, 12, 13, by means of which the auxiliary tip 10 can be mounted on various boom parts of an work machine, in the present example on a pulley head 8 of a telescopic boom 4 of a mobile crane 1 as well as on the head piece of a luffing tip 5 (cf. FIG. 7).

The auxiliary tip 10 comprises two first connecting elements 11 in the form of open bolt receptacles 16, which are arranged at the ends or end faces of the first corner posts 21 facing away from the pulley block 19. The bolt receptacles 16 define a first connecting axis 61, which extends through the centers of the imaginary circles resulting from the shape of the open bolt receptacles 16 (cf. FIG. 5). In the embodiment example shown here, the first connecting axis 61 extends perpendicular to the first corner posts 21. The first connecting elements 11 serve to establish a first connection with a boom part, together with corresponding bolt-shaped connecting means of the boom part. The latter extend along the first connection axis 61 in the connected state.

The auxiliary tip 10 further comprises two second connecting elements 12 in the form of closed bolt receptacles 14, which are arranged at the ends or end faces of the second corner posts 22 facing away from the pulley block 19. The bolt receptacles 14 define a second connecting axis 62 which extends centrally through the bolt receptacles 14 (cf. FIG. 5). Corresponding bolts are inserted along this connecting axis 62 for establishing a second connection with a boom part.

As shown in FIG. 5, the first connecting elements 11 are spaced at a distance $b_1$ from each other, while the second connecting elements 12 are spaced at a distance $b_2$ from each other. In the embodiment example shown here, the distances are identical, i.e. $b_1=b_2$. Thus, the first and second connecting elements 11, 12 form the corners of a rectangle. However, the distances $b_1$ and $b_2$ can in principle also be different. The distance between the first and second connecting elements 11, 12 is referred to as $h_1$ Via the first and second connecting elements 11, 12, the auxiliary tip 10 can be mounted, for example, on the pulley head 8 of the telescopic boom 4 of a mobile crane 1, as shown in the left figure of FIG. 7. In this case, the system dimension $b_1$, $b_2$, $h_1$ defined by the first and second connecting elements 11, 12 corresponds to the system dimension formed by the corresponding connecting means 81, 82 of the pulley head 8.

The first and second connecting elements 11, 12 represent fingers of fork-finger connections in the embodiment example shown here. Accordingly, the complementary connecting means 81, 82 of the pulley head 8 form corresponding forks. The first connecting elements 11, together with the first connecting means 81 (these may comprise already inserted bolts), form a first connection between the auxiliary tip 10 and the pulley head 8. A second connection is established by bringing the second connecting elements 12 into overlap with second connecting means 82 of the pulley head 8 and inserting bolts through the corresponding bolt receptacles.

As can be seen in the right-hand illustration of FIG. 7 using the example of a head piece of a lulling tip 5, it is possible that other crane components have connecting means with a different system dimension which does not correspond to the system dimension of the auxiliary tip 10 defined by the first and second connecting elements 11, 12. For this purpose, the auxiliary tip 10 according to the invention additionally comprises third connecting elements 13 which have a different distance from one another or define a different system dimension than the second connecting elements 12. In the embodiment example shown here, two third connecting elements 13 in the form of forks are provided for a fork-finger connection with closed bolt receptacles 15, which have a smaller distance $b_3$ from one another than the first and second connecting elements have from one another, respectively, i.e. $b_3<b_2$ and $b_3<b_1$.

The third connecting elements 13 project parallel to the second corner posts 22 from a cross strut 24 connecting the second corner posts 22 and are arranged between the two second corner posts 22. The bolt receptacles 15 of the third connecting elements 13 define a third connecting axis 63, which extends centrally through the bolt receptacles 15 (cf. FIG. 5). The distance between the first and third connecting elements 11, 13 is referred to as $h_2$ and is smaller than the distance $h_1$ between the first and second connecting elements 11, 12. The system dimension $b_1$, $b_3$, $h_2$ defined by the first and third connecting elements 11, 13 is thus different from the system dimension $b_1$, $b_2$, $h_1$ defined by the first and second connecting elements 11, 12. The former forms a trapezoid with a smaller height than the rectangle formed by the first and second connecting elements 11, 12.

This allows the auxiliary tip 10 to be mounted on another boom part, for example the luffing tip 5 shown in FIG. 7, whose connecting means 51, 52 have a different system dimension than the connecting means 81, 82 of the pulley head 8. For this purpose, a first connection with first connecting means 51 of the luffing tip 5 is still made using the first connecting elements 11. For the second connection with corresponding second connecting means 52 of the luffing tip 5, not the second connecting elements 12 but the third connecting elements 13 of the auxiliary tip 10 are now used (cf. right figure of FIG. 7).

The use of an adapter can thus be dispensed with. Depending on the boom part and system dimension, different connecting elements 11, 12, 13 of the auxiliary tip 10 according to the invention can be used for assembly. Of course, further connecting elements can be provided so that more than two different system dimensions are covered by the auxiliary tip 10 according to the invention.

Figure 6:
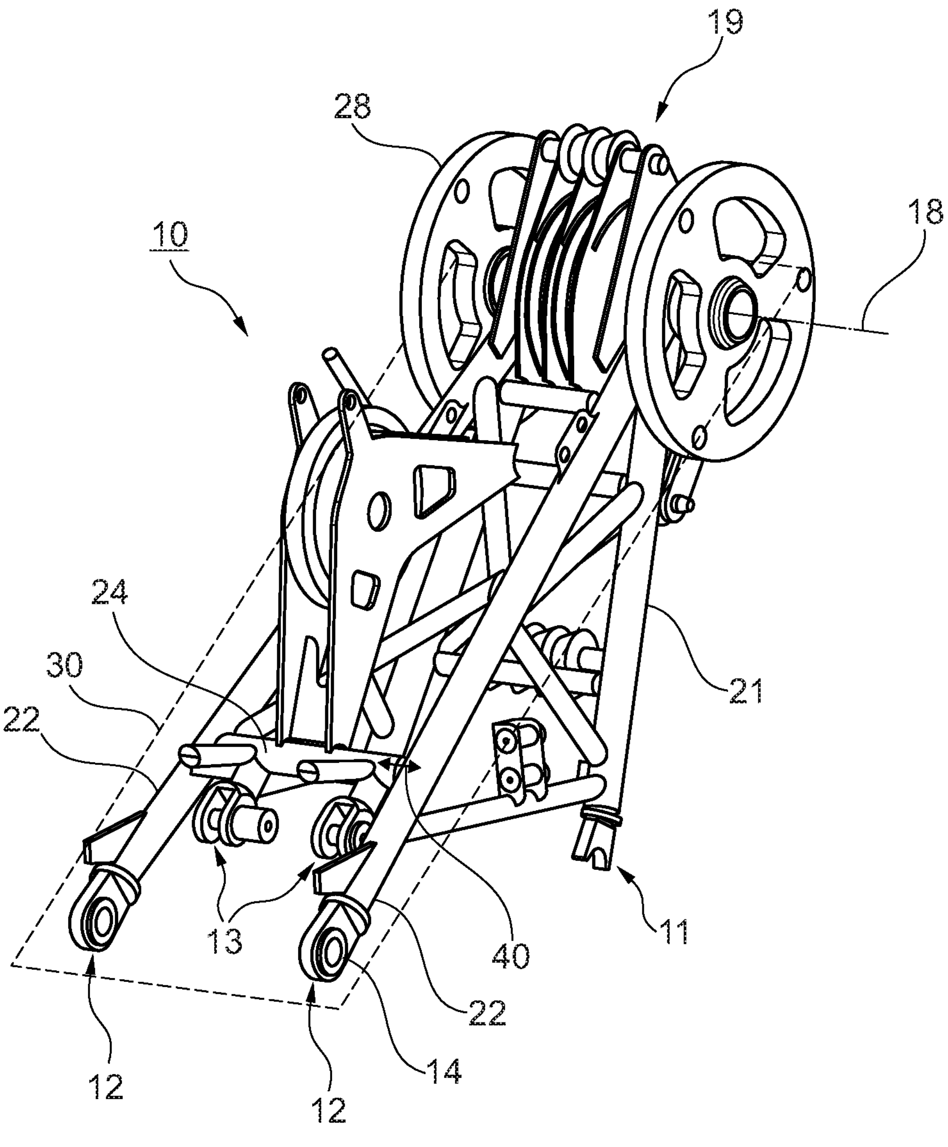

As shown in FIG. 6, the second corner posts 22 and the second and third connecting elements 12, 13 (or the connecting axes 62, 63 defined by them) are located in a common first plane 30. This plane 30 can also be referred to as the first force flow plane 30 since the essential forces flow over the second corner posts 22 without major deflections both when they are connected via the second connecting elements 12 and via the third connecting elements 13. The force flow always occurs in the common plane 30.

In the case of a connection via the third connecting elements 13, the forces are transmitted via the cross strut 24 and further via the second corner posts 22 to the deflection pulleys 19. The third connecting elements 13 are arranged close to the second corner posts 22 in order to keep the lever arm designated by the reference sign 40 in FIG. 6 as small as possible. This results in a more or less direct force flow with low leverage.

If necessary, it may be necessary to make the cross strut 24 reinforced, i.e. it may, for example, have a larger diameter and/or wall thickness than the first and/or second corner posts 21, 22.

As a result of the fact that no further corner posts or additional supporting steel structure is required, the additional connecting elements 13 result in only a minimally higher dead weight of the auxiliary tip 10. In the embodiment example shown here, the third connecting elements 13 are also integrated into the component in a space-saving manner (i.e., arranged between the second corner posts 22) in such a way that, in addition to a good force flow, the transport dimensions of the auxiliary tip 10 do not increase significantly.

The first corner posts 21 and the first connecting elements 11 (or the first connecting axis 61 defined by them) form a second common force flow plane (not shown), since the forces transmitted through the first connecting elements 11 are essentially conducted along the first corner posts 21.

In particular, the forces conducted through the second corner posts 22 are predominantly tensile forces, while predominantly compressive forces are conducted through the first corner posts 21, since the first corner posts 21 are generally located below the second corner posts 22 in the assembled state during regular crane operation with a second hook block 6*b*, and the dead weight of the auxiliary tip 10 and any attached load press the first connecting elements 11 against the boom 4.

The axis of rotation 18 of the roller pack 19 is located in both the first force flow plane 30 and the second force flow plane, i.e. both planes intersect in the axis of rotation 18 (at an acute angle in the embodiment example shown here).

As already described, the first connecting elements 11 in the embodiment example shown here are configured as finger elements with open bolt receptacles 16. This has the advantage that the auxiliary tip 10 cannot be overloaded during the assembly process. If the auxiliary tip 10, as shown in a lateral view in FIG. 8, touches the ground in the assembled state because the boom (in the case shown, the auxiliary tip 10 is mounted on a luffing tip 5) is appropriately luffed up or down (e.g. for assembly or disassembly), the auxiliary tip 10 can pivot away around the second connection so that the connecting elements 11 move away from the corresponding connecting means 51 of the luffing tip 5. As a result, the auxiliary tip 10 is not loaded. Pulleys 28 are provided for unrolling the auxiliary tip 10 in the present embodiment.

If, on the other hand, the auxiliary tip 10 did not have open forks, then it would be pressed to the ground by the dead weight of the luffing tip 5 when the guy rods were unloaded. This dead weight could generate a greater load than the force acting during operation, thereby overloading the auxiliary tip 10.

For locking the first connection during crane operation (i.e., outside the assembly and disassembly process), a corresponding locking device can optionally be provided to releasably lock the first connecting elements 11 of the auxiliary tip 10 to the first connecting elements 51, 81 of the corresponding boom part 5, 8.

The core idea of the present invention is to provide several connecting elements 11, 12, 13 with different system dimensions on one and the same auxiliary tip 10, i.e. to integrate several system dimensions in the auxiliary tip 10 so that it can be mounted on different boom parts 5, 8 with different system dimensions without adapters or additional measures. As already mentioned, two or more system dimensions can be realized by the connecting elements 11, 12, 13.

The precise shape and arrangement of the individual connecting elements is not limited to the embodiment described with reference to the figures. For example, it is conceivable that the first connecting elements 11 comprise closed bolt receptacles. Likewise, it is possible that the first and/or second connecting elements 11, 12 are configured not as finger elements but as fork elements each having two adjacent metal sheets with bolt receptacles. The third connecting elements 13 can alternatively be configured as finger elements.

It is also conceivable in principle that some or all of the connecting elements 11, 12, 13 are oriented differently than shown in the figures. For example, the first and/or second and/or third connecting elements 11, 12, 13 could be rotated by 90° (or any other angle) and the corresponding bolt receptacles could therefore not face each other. Also, the second and/or third connecting elements 12, 13 could be configured as hook elements via which the auxiliary tip 10 is first hooked into corresponding connecting means of a boom part and then pivoted towards the boom part around the second connection thus established until the first connection is established. In this case, the first connecting elements 11 are preferably equipped with closed bolt receptacles in order to ensure safe storage of the auxiliary tip 10 here.

Likewise, it is conceivable that the third connecting elements 13 are located outside the second corner posts 22 and therefore have a greater distance $b_3$ from one another than the second connecting elements 12. Alternatively or additionally, the third connecting elements 13 could be located outside the force flow plane 30 defined by the second corner posts 22, for example above the first force flow plane 30 or between the first and second force flow planes.

Optionally, an automatic bolt insertion or extraction device can be provided in the area of the bolt receptacles 15 of the third connecting elements 13, as shown by way of example in FIG. 6. This bolt extraction device is not shown in the other figures and does not necessarily have to be provided. A manual bolt insertion or extraction device is of course also conceivable.

Instead of open bolt receptacles 16, the first connecting elements 11 could also have reverse bolt elements that cooperate with corresponding open bolt receptacles of the boom part and form the first connection.

LIST OF REFERENCE CHARACTERS

- 1 mobile crane
- 2 undercarriage
- 3 upper carriage
- 4 boom (telescopic boom)
- 5 luffing tip
- 6*a* first hook block
- 6*b* second hook block
- 7 adapter
- 8 pulley head
- 9*a* first connecting means
- 9*b* second connecting means
- 10' auxiliary tip (prior art)
- 10 auxiliary tip
- 11 first connecting element 12 second connecting element
13 third connecting element
14 bolt receptacle
15 bolt receptacle
16 open bolt receptacle
18 axis of rotation
19 pulley block
20 lattice structure
21 first corner post
22 second corner post
24 strut
26 deflection pulley
28 pulley
30 first plane
40 lever arm
51 first connecting means (luffing tip)
52 second connecting means (luffing tip)
61 first connecting axis
62 second connecting axis
63 third connecting axis
81 first connecting means (pulley head)
82 second connecting means (pulley head)
$b_1$ distance between the first connecting elements
$b_2$ distance between the second connecting elements
$b_3$ distance between the third connecting elements
$h_1$ distance between first and second connecting elements
$h_2$ distance between first and third connecting elements

The invention claimed is:

1. Auxiliary tip for detachable mounting on a boom of a work machine, comprising first connecting elements for establishing a first connection with a first boom part and second connecting elements for establishing a second connection with the first boom part, and third connecting elements for producing a second connection instead of the second connecting elements, wherein the auxiliary tip is detachably connectable to a second boom part via the third connecting elements, and wherein the second connecting elements are at a different distance from one another than the third connecting elements.

2. Auxiliary tip according to claim 1, wherein exactly two first connecting elements and/or exactly two second connecting elements and/or exactly two third connecting elements are provided.

3. Auxiliary tip according to claim 1, wherein the first connection and/or the second connection comprises a bolt connection, wherein the second and third connecting elements each comprise a bolt receptacle.

4. Auxiliary tip according to claim 1, wherein the second and third connecting elements are in a common first plane and each comprise bolt receptacles for producing a bolt connection, which are configured in such a way that the imaginary longitudinal axes of the bolt connections which can be produced via the second and third connecting elements are in the first plane, and/or wherein the first connecting elements are arranged on first corner posts and comprise bolt receptacles which are configured in such a way that the imaginary longitudinal axis of the bolt connection which can be produced via the first connecting elements is in a common second plane with the first corner posts.

5. Auxiliary tip according to claim 4, wherein the auxiliary tip is detachably connectable to a second boom part via the first and third connecting elements and/or wherein the auxiliary tip comprises fourth connecting elements and is detachably connectable to a second boom part via the third and fourth connecting elements, wherein the fourth connecting elements are at a different distance from one another than the first connecting elements.

6. Auxiliary tip according to claim 1, further comprising a lattice structure having first corner posts on which the first connecting elements are arranged and second corner posts on which the second connecting elements are arranged, wherein the lattice structure has a substantially triangular shape when viewed from the side and the first and second connecting elements are arranged on the side of the lattice structure opposite the pointed end of the lattice structure.

7. Auxiliary tip according to claim 6, wherein the second corner posts extend in a common first plane and the first corner posts extend outside the first plane, in a second plane intersecting the first plane at an acute angle.

8. Auxiliary tip according to claim 6, wherein the third connecting elements are arranged on a strut connecting the second corner posts to each other and have a smaller distance from each other than the first and/or second connecting elements.

9. Auxiliary tip according to claim 1, wherein the second connecting elements have a greater distance to the first connecting elements and/or to an axis of rotation of a pulley or pulley block of the auxiliary tip than the third connecting elements.

10. Auxiliary tip according to claim 1, wherein the first and second connecting elements and/or the first and third connecting elements form the corners of a rectangle or a trapezoid.

11. Auxiliary tip according to claim 1, wherein the first connecting elements comprise a degree of freedom for establishing a pressure-transmitting connection, wherein the first connecting elements comprise open bolt receptacles, and the establishment of the first connection is effected by pivoting the auxiliary tip relative to a boom part by pivoting about the second connection.

12. Auxiliary tip according to claim 1, further comprising a pulley or pulley block for a lifting cable of a work machine, wherein the pulley or pulley block is arranged at an end of the auxiliary tip opposite the first and/or second connecting elements.

13. Work machine, comprising a boom and an auxiliary tip which can be detachably mounted on the boom, according to claim 1, wherein the second and third connecting elements are in a common first plane which extends perpendicular to a luffing plane of the boom.

14. Work machine according to claim 13, wherein the boom comprises a pulley head, which can be connected to the auxiliary tip only via the first and second connecting elements.

15. Work machine according to claim 14, wherein the auxiliary tip comprises a pulley or pulley block and is connected to the pulley head of the boom, wherein a first hook block is guided via the pulley head of the boom and a second hook block is guided via the pulley or pulley block of the auxiliary tip, wherein the hook blocks can be raised and lowered independently of one another.

16. Work machine according to claim 13, wherein the boom comprises a luffing tip, which can be connected to the auxiliary tip only via the first and third connecting elements.

* * * * *